(12) United States Patent
Sagfors et al.

(10) Patent No.: US 11,533,130 B2
(45) Date of Patent: *Dec. 20, 2022

(54) METHOD AND ARRANGEMENT FOR RETRANSMISSION USING HARQ

(71) Applicant: Optis Wireless Technology, LLC, Plano, TX (US)

(72) Inventors: Mats Fredrik Sagfors, Kyrkslatt (FI); Michael Meyer, Aachen (DE); Per Johan Torsner, Masaby (FI); Henning Wiemann, Aachen (DE)

(73) Assignee: Optis Wireless Technology, LLC, Plano, TX (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/136,318

(22) Filed: Dec. 29, 2020

(65) Prior Publication Data

US 2021/0119737 A1 Apr. 22, 2021

Related U.S. Application Data

(63) Continuation of application No. 15/606,821, filed on May 26, 2017, now Pat. No. 10,903,940, which is a continuation of application No. 14/628,520, filed on Feb. 23, 2015, now Pat. No. 9,698,942, which is a continuation of application No. 13/717,753, filed on
(Continued)

(30) Foreign Application Priority Data

Jun. 18, 2007 (SE) .................................... 0701495-4

(51) Int. Cl.
*G06F 11/00* (2006.01)
*H04L 1/08* (2006.01)
*H04L 1/18* (2006.01)

(52) U.S. Cl.
CPC .............. *H04L 1/08* (2013.01); *H04L 1/1812* (2013.01); *H04L 1/1819* (2013.01); *H04L 1/1887* (2013.01); *H04L 1/1896* (2013.01)

(58) Field of Classification Search
CPC ............. G06F 11/3031; G06F 11/0757; G06F 11/076; G06F 11/0772; G06F 11/1425
See application file for complete search history.

(56) References Cited

U.S. PATENT DOCUMENTS 8,045,513 B2 10/2011 Kim et al.
8,370,696 B2 2/2013 Sagfors et al.
(Continued)

FOREIGN PATENT DOCUMENTS

EP 1508980 2/2005
JP 2003018131 1/2003
(Continued)

OTHER PUBLICATIONS

EP Communication 94(3) EP Application No. 13166832.9 dated Dec. 8, 2016.
(Continued)

*Primary Examiner* — Amine Riad
(74) *Attorney, Agent, or Firm* — Nixon & Vanderhye P.C.

(57) ABSTRACT

Coverage of a power-limited mobile terminal is enhanced by sending information relating to a single Hybrid Automatic Repeat Request (HARQ) process from the mobile terminal to a base station using several transmission time intervals.

20 Claims, 9 Drawing Sheets

Related U.S. Application Data

Dec. 18, 2012, now Pat. No. 8,966,333, which is a continuation of application No. 12/665,191, filed as application No. PCT/SE2008/050688 on Jun. 10, 2008, now Pat. No. 8,370,696.

(56) References Cited

U.S. PATENT DOCUMENTS

| | | | |
|---|---|---|---|
| 8,966,333 B2 | 2/2015 | Sagfors et al. | |
| 9,698,942 B2 | 7/2017 | Sagfors et al. | |
| 2005/0249120 A1 | 11/2005 | Heo et al. | |
| 2006/0104242 A1* | 5/2006 | Kim | H04L 1/1822 370/468 |
| 2007/0245201 A1* | 10/2007 | Sammour | H04L 1/1854 714/748 |
| 2007/0255994 A1* | 11/2007 | Michel | H04L 1/1816 714/751 |
| 2008/0080424 A1* | 4/2008 | Torsner | H04L 1/1819 370/330 |
| 2009/0046627 A1* | 2/2009 | Xu | H04W 52/0209 370/328 |
| 2010/0085927 A1* | 4/2010 | Torsner | H04W 72/0413 370/329 |
| 2011/0173519 A1* | 7/2011 | Kuri | H04L 1/1671 714/799 |
| 2013/0114487 A1* | 5/2013 | Kim | H04L 1/0025 370/329 |

FOREIGN PATENT DOCUMENTS

| | | |
|---|---|---|
| JP | 2005323366 | 11/2005 |
| JP | 2006-211313 | 8/2006 |
| JP | 5658834 | 1/2015 |
| WO | 0154339 | 7/2001 |
| WO | 200154339 | 7/2001 |
| WO | 2000154339 | 7/2001 |
| WO | 2006105004 | 10/2006 |
| WO | 2006105005 | 10/2006 |
| WO | 2007007383 | 1/2007 |

OTHER PUBLICATIONS

"TTI Bundling in FDD and TD-LTE", Expert Opinion, Retrieved at http://lteuniversity.com/get_trained/expert_opinion1/b/sekhar/archive/2012/08/13/tti-bundling-in-fdd-and-td-lte.aspx, dated Aug. 13, 2012. 4 pages.
"TTI Bundling", All About Wired and Wireless Technology, Retrieved at http://www.simpletechpost.com/2012/05/tti-bundling-in-lte.html, dated May 2012, 1 page.
TTI Bundling, How LTE Stuff Works? , Retrieved at http://howthestuffworks.blogspot.com/2014/06/tti-bundling.html; dated Jun. 16, 2014, 3 pages.
Ericsson, "E-UTRA Uplink Radio Access", TSG-RAN WG1 AdHoc on LTE, Jun. 20-21, 2005, Sophia Antipolis, FR, R1-050620.
Falahati S. et al.: "Hybrid type-II ARQ schemes with adaptive modulation systems for wireless channels", Vehicular Technology Conference, 1999. VTC 1999—Fall. IEEE VTS 50th AMS.
Dahlman, Erik. et al. "3G Evolution: HSPA and LTE for Mobile Broadband", 2007. 448 pages.
Lucent Technologies, "A2IR—An Asynchronous and Adaptive Hybrid ARQ Scheme for HSDPA," 2001, pp. 1-10, TSGR1#18(01)0080.
Office Action dated Dec. 8, 2016 as received in EP Application No. 13166832.9.
Office Action dated May 22, 2017 as received in JP Application No. 2016-094822.
Office Action dated Mar. 11, 2019 in JP Application No. 2018-089432, 5 pages.
Translation of Office Action dated Mar. 11, 2019 in JP Application No. 2018-089432, 5 pages.

\* cited by examiner

METHOD AND ARRANGEMENT FOR RETRANSMISSION USING HARQ

RELATED APPLICATIONS

This application is a continuation of U.S. application Ser. No. 15/606,821, filed May 26, 2017, which is a continuation of U.S. application Ser. No. 14/628,520, filed Feb. 23, 2015 (now U.S. Pat. No. 9,698,942), which is a continuation of U.S. application Ser. No. 13/717,753, filed Dec. 18, 2012 (now U.S. Pat. No. 8,966,333), which is a continuation of U.S. application Ser. No. 12/665,191, filed Dec. 17, 2009 (now U.S. Pat. No. 8,370,696), which is the US national phase of International Application No. PCT/SE2008/050688, filed Jun. 10, 2008, which designates the US and claims priority to SE Application No. 0701495-4, filed Jun. 18, 2007, the entire contents of each of which are hereby incorporated by reference in this application.

TECHNICAL FIELD

The present invention relates to method and arrangement in a mobile telecommunications network. In particular it relates to coverage enhancement for power-limited mobile terminals in the mobile telecommunication network.

BACKGROUND

Mobile telecommunications network typically includes a radio access network connected to core network 100 as illustrated in FIG. 1. The core network 100 can be interconnected with other networks and the radio access network comprises radio base stations 130a-130d, each configured to communicate over the radio interface with mobile terminals 150 located in the cell served by the respective radio base station.

At the cell-edge, the mobile terminals are sometimes power-limited, i.e. their transmission power is not sufficient to reach the targeted transmission error rate, the so-called block error rate. It is therefore a need to find a solution for enhancing the coverage for power-limited mobile terminals. HARQ (Hybrid Automatic Repeat reQuest) is a well-known technique to mitigate such situations.

Automatic Repeat reQuest (ARQ) is an error control method for data transmission which uses acknowledgments and timeouts to achieve reliable data transmission. An acknowledgment is a message sent by the receiver to the transmitter to indicate that it has correctly received a data frame or packet. A timeout is a reasonable point in time after the sender sends the frame/packet. If the sender does not receive an acknowledgment before the timeout, it usually re-transmits the frame/packet until it receives an acknowledgment or exceeds a predefined number of re-transmissions. A variation of ARQ is Hybrid ARQ (HARQ) which has better performance, particularly over wireless channels.

HARQ operation modes can use incremental redundancy and Chase combining. By using HARQ, the user data can be transmitted multiple times. For each transmission or retransmission either the same (Chase combining) or potentially a different redundancy version (incremental redundancy) is sent. When a corrupted packet is received, the receiver saves the soft information, requests a retransmission by sending a negative acknowledgement and later combines it with the already received soft information with the soft information conveyed in the retransmissions to recover the error-free packet as efficiently as possible. By doing so it essentially accumulates the energy of all transmissions and retransmissions. Typically, after a few HARQ retransmissions the data is successfully received.

Consequently, a HARQ process takes care of the transmission of the first transmission and potential retransmissions at the sender side and the corresponding reception at the receiver side. In addition, the sender side process interprets the HARQ feedback and the receiver side generates the corresponding HARQ feedback according to the reception state.

If the number of retransmissions that is required for a successful transmission is growing, the retransmission delay is also increasing proportionally. For every retransmission round one HARQ Round Trip Time (RTT) is required. For some applications only a certain delay is acceptable. If such delay bounds need to be kept, alternative approaches are needed.

Another problem of the approach above is that the HARQ feedback is typically quite sensitive, since often only a single bit is used for ACK or NACK. Assuming that 9 retransmissions are needed and the HARQ feedback error rate is $10^{-3}$ this results in an overall probability that at least one of the HARQ feedback is subject to a NACK-ACK error of roughly $10^{-2}$. Since such NACK-ACK error leads to a data packet loss, unless another retransmission protocol is used in addition to HARQ, a large number of required HARQ retransmissions might lead to unacceptable packet loss rates for certain applications. For example, $10^{-2}$ is often mentioned as packet loss requirement for Voice over IP applications, i.e. less than $10^{-2}$ IP packet should be lost to maintain an acceptable voice quality.

One state-of-the-art approach to reduce the number of HARQ retransmissions of a single HARQ process is segmentation at L2, which is illustrated in FIG. 2. In this solution user data is segmented in smaller portions that are then transmitted in independent HARQ processes. I.e. each segment is subject for a HARQ feedback. Although this solution reduces the risk of a HARQ feedback failure for a single process, it does not reduce the probability of an IP packet loss, since all HARQ processes that carry a segment of the IP packet need to be received correctly. In total, the probability for a HARQ feedback failure is therefore in the same order.

Example: Instead of sending 264 bits of user data in one HARQ process, the user data might be split up in 4 parts leading to 4 HARQ processes with 66 bits each. In the original case 16 HARQ transmissions might be needed. For the L2 segmentation case, this would correspond to 4 HARQ transmissions for each process. These are in total still 16 transmissions. However, they can be parallelized, since in state-of-the-art systems, several HARQ processes can be active at the same time. Thus, the transmission delay can be reduced by L2 segmentation.

However, the above described approach has the disadvantage that the L2 protocol headers (e.g. MAC and RLC) that are needed to describe the user data (e.g. Sequence Number, length) and the segmentation (segmentation flags, segment length in LTE) grows with increasing number of segments. In addition, typically L1 adds a checksum. Thus additional overhead is introduced.

SUMMARY

The object of the present invention is to provide a solution for enhancing the coverage for power-limited terminals.

This is achieved by the present invention by using a plurality of transmission time intervals for transmitting information relating to a single HARQ process. I.e. information relating to one single HARQ process is transmitted in a plurality of TTIs and no HARQ feedback information is needed to trigger each of the transmissions. The plurality of TTIs used for the transmissions relating to the single HARQ process are considered as one resource which provides an increased transmission power compared to the case where only a single TTI is used. In order to avoid collisions with transmissions and retransmissions referred to as a first HARQ operation mode which uses a single TTI for transmissions and retransmissions and where the timing relationship between transmissions and retransmissions is pre-determined, the retransmissions of the present invention begin at least at a second available retransmission occurrence according to the first HARQ operation mode. E.g. the retransmission may begin two or any integer number of RTTs subsequent to the first TTI used for the transmission. The number of TTIs used for a transmission round may be configured by RRC signaling or by MAC scheduling grant.

According to a first aspect of the present invention, a method in a mobile terminal wirelessly connectable to a radio base station of a mobile telecommunication network is provided. The network supports at least two HARQ operation modes of which the first HARQ operation mode uses a single TTI for transmissions and retransmissions and where the timing relationship between transmissions and retransmissions is pre-determined and where the time between HARQ transmission and retransmission is defined as HARQ round trip time. It should also be noted that the time between one retransmission and a further retransmission also is a HARQ RTT. In the method information is transmitted according to the second HARQ operation mode relating to a first HARQ process by using a first predetermined number of TTIs comprising at least a first TTI and a second TTI to the radio base station. An indication that the transmitted information was not decoded correctly at the radio base station is received and the information is retransmitted according to the second HARQ operation mode relating to the first HARQ process by using a second predetermined number of TTIs. The retransmission begins at least at a second available retransmission occurrence according to the first HARQ operation mode, subsequent to the first TTI.

According to a second aspect of the present invention, a method in the radio base station is provided. In the method, the mobile terminal is configured by the radio base station to transmit information, according to the second HARQ operation mode, relating to a first HARQ process using a first predetermined number of TTIs comprising at least a first TTI and a second TTI, to the radio base station, and to retransmit the information, according to the second HARQ operation mode, relating to the first HARQ process using a second predetermined number of TTIs. The retransmission begins at least at a second available retransmission occurrence according to the first HARQ operation mode, subsequent to the first TTI. Information relating to the first HARQ process using the first predetermined number of TTIs comprising at least the first TTI and the second TTI is received, and HARQ feedback is transmitted in response to the received information on the first determined number of TTIs.

According to a third aspect a mobile terminal wirelessly connectable to a radio base station of a mobile telecommunication network is provided. The mobile telecommunication network supports at least two HARQ operation modes of which the first HARQ operation mode uses a single TTI for transmissions and retransmissions. For the first HARQ operation mode, the timing relationship between transmissions and retransmissions is pre-determined the time between HARQ transmission and retransmission is defined as HARQ round trip time. The mobile terminal comprises means for transmitting information according to the second HARQ operation mode relating to a first HARQ process by using a first predetermined number of TTIs comprising at least a first TTI and a second TTI, to the radio base station. It further comprises means for receiving an indication that the transmitted information was not decoded correctly at the radio base station, and means for retransmitting the information according to the second HARQ operation mode relating to the first HARQ process by using a second predetermined number of TTIs. The retransmission begins at least at a second available retransmission occurrence according to the first HARQ operation mode, subsequent to the first TTI.

According to a fourth aspect of the present invention, a radio base station of the mobile telecommunication network wirelessly connectable to a mobile terminal is provided. The mobile telecommunication network supports at least two HARQ operation modes of which the first HARQ operation mode uses a single TTI for transmissions and retransmissions. For the first HARQ operation mode, the timing relationship between transmissions and retransmissions is pre-determined the time between HARQ transmission and retransmission is defined as HARQ round trip time. The radio base station comprises means for configuring the mobile terminal. The mobile terminal is configured to transmit information, according to the second HARQ operation mode, relating to a first HARQ process using a first predetermined number of TTIs comprising at least a first TTI and a second TTI, to the radio base station, and to retransmit the information, according to the second HARQ operation mode, relating to the first HARQ process using a second predetermined number of TTIs. The retransmission begins at least at a second available retransmission occurrence according to the first HARQ operation mode, subsequent to the first TTI, The radio base station further comprises means for receiving information relating to the first HARQ process using the first predetermined number of TTIs comprising at least the first TTI and the second TTI. Further, the radio base station comprises means for transmitting HARQ feedback in response to the received information on the first determined number of TTIs.

An advantage with embodiments of the present invention is that the solution is efficient in terms of protocol header overhead, CRC overhead, L1/L2 control signaling and HARQ feedback signaling.

Further advantages with embodiments of the present invention include that the mechanism of the TTI bundling allows to artificially increase the transmission time interval and thereby the coverage of power limited terminals. Compared to prior art solutions the delay as well as the failure probability is reduced. Furthermore, the solution is simple to incorporate with the state-of-the-art mode of operation.

The invention will now be described more in detail with the aid of preferred embodiments in connection with the enclosed drawing.

DETAILED DESCRIPTION

Those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The present invention relates to the idea of using a plurality of transmission time intervals (TTIs) to send information related to a single HARQ process. This implies that an initial transmission associated with a HARQ process is followed by one or more retransmissions associated with the HARQ process, wherein the retransmissions are sent independently of reception of any feedback information. The initial transmission and the following retransmissions relating to the same HARQ process are sent without reception of any feedback information are referred to as a TTI bundle. The number of TTIs or subframes used in a bundle is denoted as TTI bundle size. However, for one TTI bundle only one HARQ feedback signal is sent by the receiver. This feedback is sent when all transmissions of a TTI bundle are received and processed. It should be noted that a TTI may also be referred to as a subframe and the terms TTI and subframe are interchangeable.

Essentially, the bundled TTIs are treated as a single resource. Therefore only a single scheduling grant or a single HARQ feedback is required to trigger transmissions or retransmissions, which results in that the utilization of the corresponding signaling resources is reduced. The number of TTIs used for the TTI bundle may be configured by a MAC scheduling grant. Alternatively, the use of this method and/or the configuration may be configured by an RRC signaling configuration message.

If the initial number of retransmissions is not sufficient for a successful reception, the receiver responds with a HARQ NACK. The HARQ NACK or a specific scheduling grant triggers then one or more additional HARQ retransmissions. This procedure continues until the HARQ transmission is completed successfully, i.e. that an ACK is received, or that a criterion is reached, which determines that this HARQ process should be terminated. For this example the HARQ process could be terminated when the maximum number of HARQ transmissions is reached.

Figure 3:
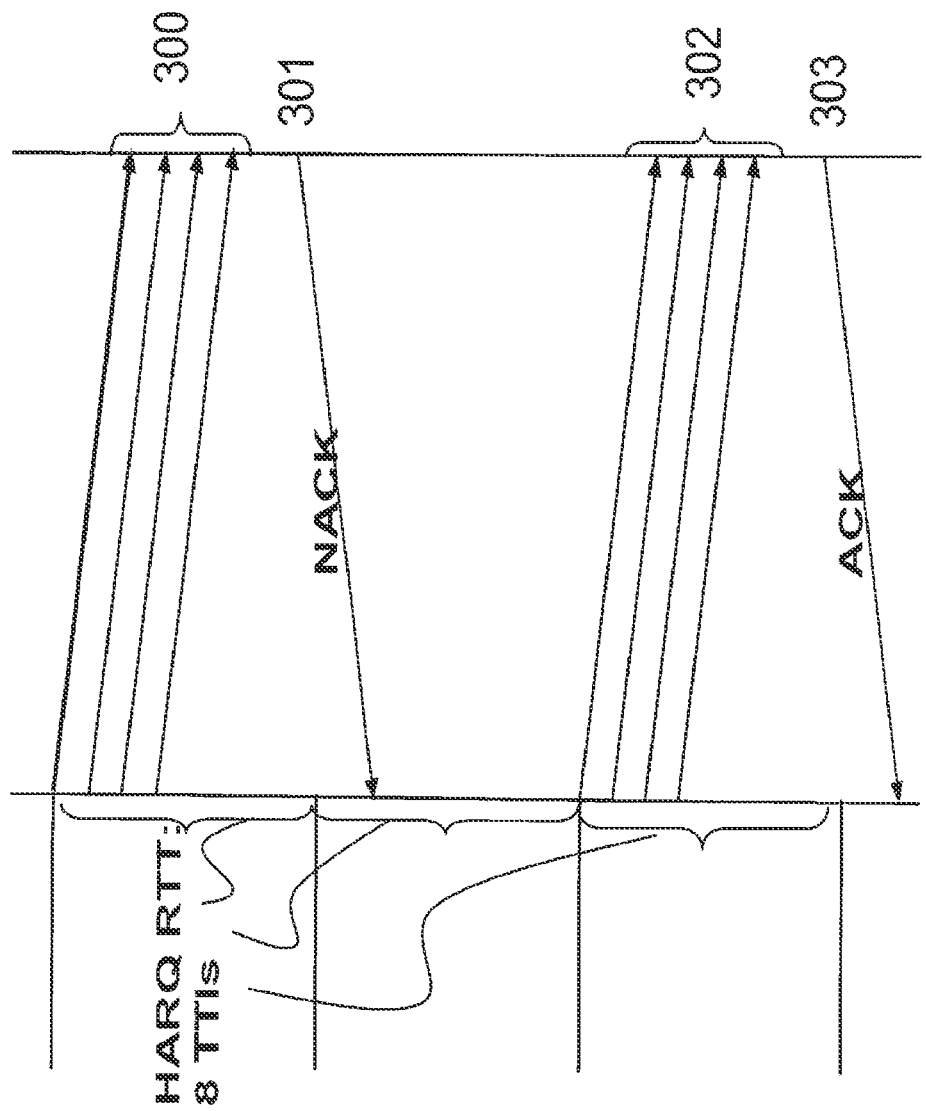
FIG. 3 illustrates TTI bundling of 4 TTIs according to an embodiment of the present invention.

According to a first embodiment of the present invention as illustrated in FIG. 3, a plurality of TTIs are bundled together implying that these bundled TTIs 300 are used for an initial transmission relating to the same HARQ process and subsequent bundled TTIs are used for subsequent HARQ retransmissions relating to the same HARQ process. A redundancy version of the single HARQ process is sent in each TTI, without waiting for any HARQ feedback information. Only when the information transmitted in the last TTI of the TTI bundle 300, 302 is received, HARQ feedback 301, 303 is sent from the receiver of the information and expected by the transmitter of the information. The timing when HARQ feedback is expected to be sent is known at the data receiver. Also when HARQ feedback is expected to be received is known at the data sender.

If synchronous HARQ is used, special care has to be taken to align the HARQ retransmissions into a HARQ process pattern. Synchronous HARQ is commonly understood as a HARQ operation where the retransmission occurs after a fixed and known time interval after the previous transmission or retransmission. In contrast is an asynchronous HARQ operation, where this timing relation is not fixed and the scheduler has a degree of freedom to decide when a retransmission is scheduled. Synchronous operation has the advantage that less control signaling is needed, since the sender and receiver know when a retransmission is due.

Figure 4:
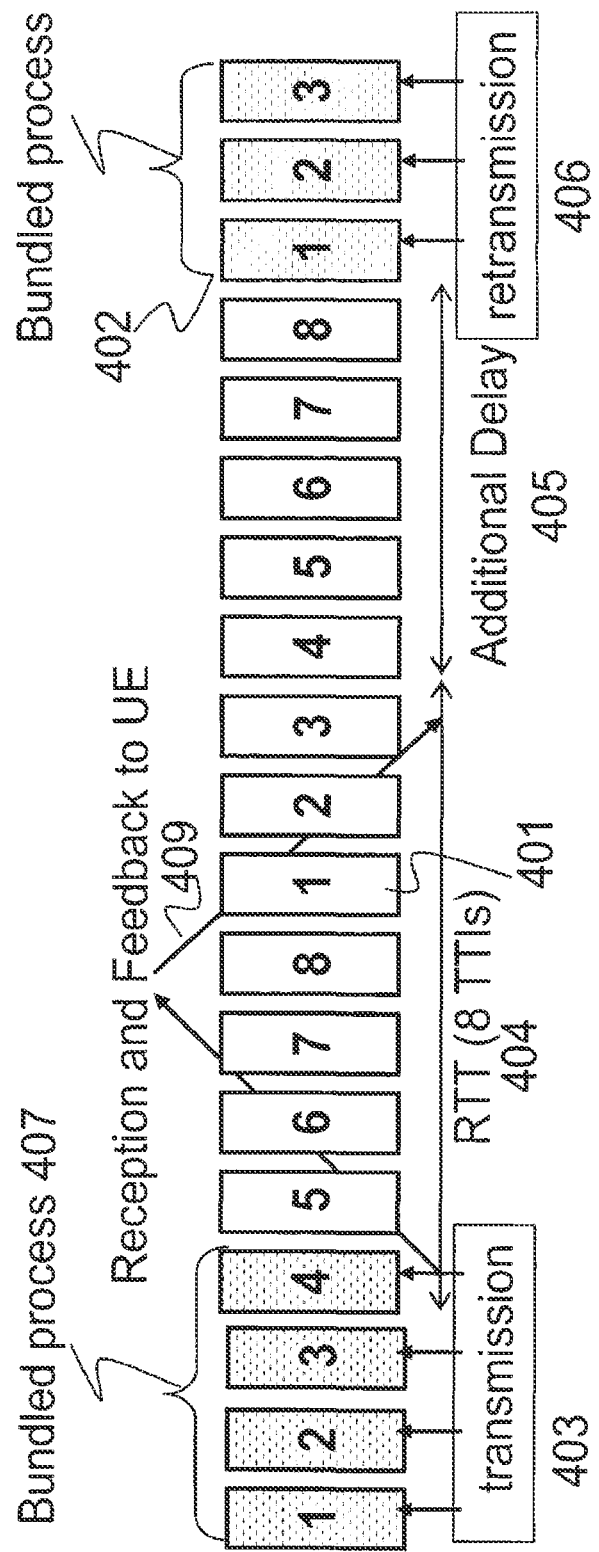
FIG. 4 also illustrates TTI bundling of 4 TTIs according to an embodiment of the present invention.
Figure 5:
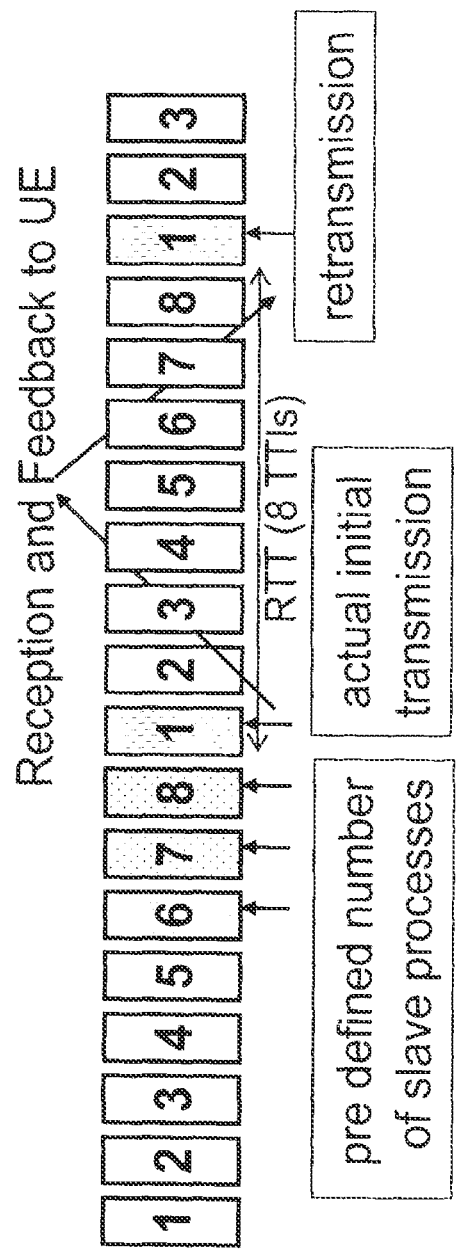
FIG. 5 illustrates another solution for enabling TTI bundling.
Figure 6:
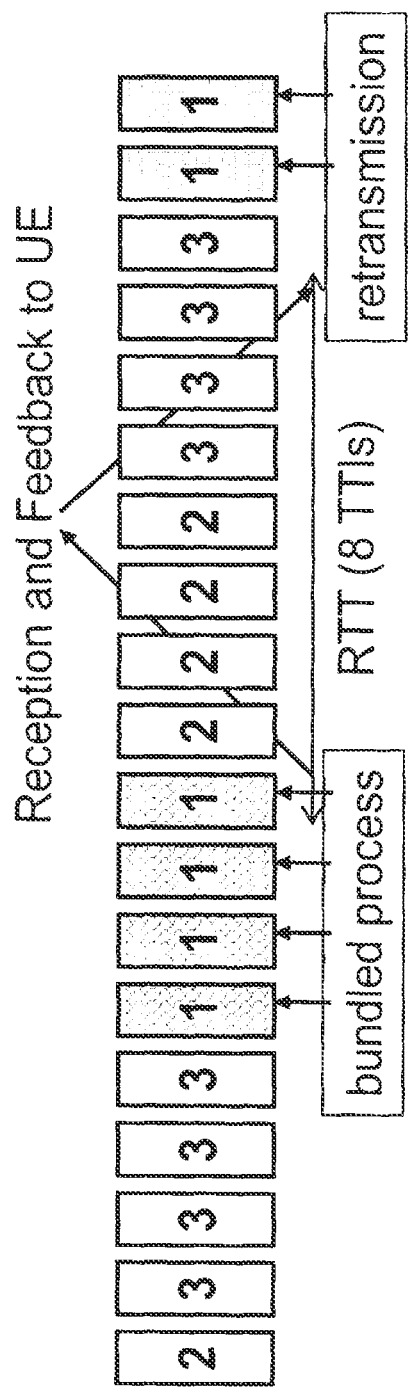
FIG. 6 illustrates a further solution for enabling TTI bundling.

The HARQ process pattern is illustrated in FIGS. 4-6. The HARQ feedback sent in response to a TTI bundle is received too late for using the first TTI of the second HARQ RTT. Therefore, it is suggested to start the HARQ retransmissions 406 synchronized with the normal HARQ RTT, but where one HARQ RTT 404 remains idle, which is shown in FIG. 4. In FIG. 4, the TTI bundle 407 consists of four TTIs, i.e. the TTIs denoted 1, 2, 3, and 4. When the information in TTI 4 is received, a feedback 409 is sent to the transmitter. It should be noted that the transmission in TTI2, TTI3 and TTI4 is transmitted independently of an received HARQ feedback information. As explained above, this feedback 409 is received too late in order to start the retransmission in the first available TTI 401 according to the normal operation mode, i.e. without TTI bundling which also is referred to as the first operation mode. Therefore additional delay 405 is applied and the retransmission 406 starts at least at the second available TTI 402, according to the first operation mode, in order to fit into the HARQ pattern of the normal operation mode. The first available TTI, or occurrence, for retransmission according to the first HARQ operation mode is the first TTI which can be used for retransmission, e.g. the first TTI associated with the same resource as the first TTI used for the initial transmission. This results in that another mobile terminal with normal HARQ operation mode could use the resources in each occurrence of TTI 5 corresponding to HARQ process 5. This process does not collide in time with the four processes used by the terminal applying TTI bundling according to the second operation mode. Without introducing the additional delay, a collision between transmissions of mobile terminals applying TTI bundling and those terminals that do not apply TTI bundling might occur. Thus collisions are efficiently avoided by introducing the additional delay. Another benefit of this approach is its simplicity and that it does not create any significant additional complexity for the scheduler.

As an example, assuming a HARQ RTT of eight TTIs in a typical configuration four TTIs may be bundled as shown in FIG. 4. I.e. the TTI bundle size if 4 and four TTIs are treated as a single resource and used for transmission of information associated with a single HARQ process. This would give room for four bundled HARQ processes to be operated in parallel, two in each HARQ RTT. Even eight TTIs could be bundled, which would still allow two HARQ processes to be active at the same time.

A further possibility is to use the first possible TTI after the HARQ feedback has been received. This would correspond to the normal synchronous HARQ operation. However, this approach has the disadvantage that transmission collisions with other terminals might occur since the HARQ round trip time of this operation mode differs from the normal HARQ RTT of users not using TTI bundles for their transmissions.

Moreover, only a small amount of extra signaling is required to configure TTI bundling according to the present invention. One typical deployment would be to configure cell-edge terminals to use for all their transmissions TTI bundling of some TTIs. Obviously, it is advantageous to find a good match between the number of TTIs—this is equivalent to the number of HARQ processes used in normal HARQ operation—that spans one HARQ RTT and the number of TTIs used for bundling. For examples, assuming 8 TTIs for the HARQ RTT, a good choice would be to allocate 2, 4, or 8 TTIs for one transmission bundle, since this allows using the remaining TTIs for other transmissions. Odd number of TTIs would make this more difficult. For example if 3 TTIs would be bundled, this would also allow using 2 such processes in one HARQ RTT, but two TTIs would be unused.

Figure 7A:
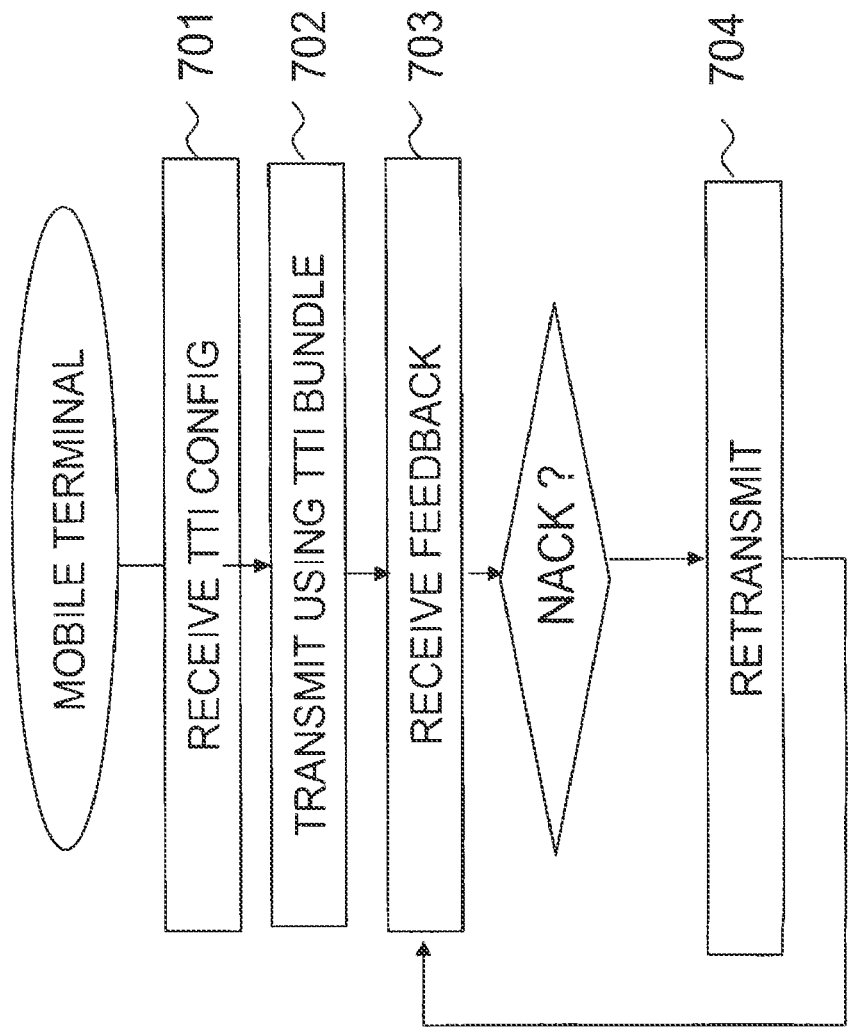
FIGS. 7a and 7b, respectively shows a flowchart of the methods according to one embodiment of the present invention.
Figure 7B:
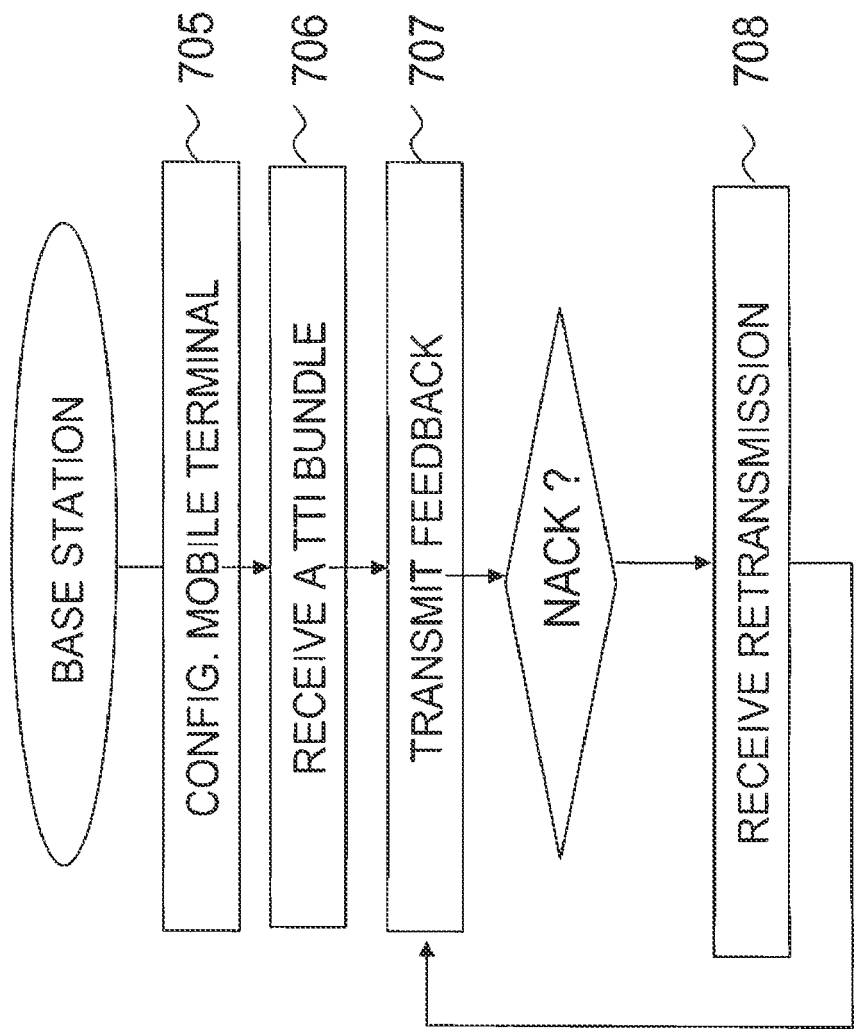

Turning now to FIGS. 7a and 7b illustrating flowcharts of the methods to be implemented in a mobile terminal and in a base station, respectively. As illustrated in the flowchart of FIG. 7a, a mobile terminal uses a plurality of transmission time intervals (TTIs) to send information related to a single HARQ process to a base station. Initially in step 701, the mobile terminal receives information of a total number of TTIs to be used for the transmission of information relating to the single HARQ process either by a MAC scheduling grant or by an RRC signaling configuration message sent 705 by the base station. This information may also comprise information that a plurality of TTIs should be used for all its transmissions. Hence, in step 702, the mobile terminal transmits information relating to a first HARQ process using at least a first and a second TTI, which implies that the TTI bundle consists of two TTIs (bundle size=2), which is received 706 by the base station. The information relating to the first HARQ process using at least the second TTI is transmitted independently of any received HARQ feedback. In this case, two TTIs are bundled but it should be noted that the number of bundled TTIs are not limited to two or four as exemplified above.

In accordance with the invention, the mobile terminal expects a single HARQ feedback information associated with at least one of the transmissions relating to the first HARQ process, e.g. associated with the two transmissions relating to the first HARQ process. Compared to the case where feedback is expected for each transmission, resources and transmission power are saved. However, if each transmission would be responded by HARQ feedback, it would be possible to ignore this feedback at the data sender, since it knows that more up to date information follows.

If this transmission using the plurality of TTIs appears to be insufficient for a successful decoding at the base station, the base station responds 707 with a negative HARQ feedback, referred to as HARQ NACK, which is received at the mobile terminal as shown in step 703. This HARQ NACK, or a specific scheduling grant, then triggers one or more HARQ retransmissions transmitted 704 from the mobile terminal and received 708 at the base station. The retransmissions continues until the HARQ transmission is decoded successfully (i.e. when a positive HARQ feedback is received as illustrated in FIG. 7a) or a criterion that determines this HARQ process shall be terminated is reached.

Accordingly, in step 703, a negative HARQ feedback information associated with at least one of the transmissions relating to the first HARQ process is received and in step 704 information relating to the first HARQ process, using at least one TTI is retransmitted in response to the received negative HARQ feedback. In accordance with one embodiment the same total number of TTIs denoted as TTI-bundle is used for the retransmission as for the transmission of information relating to the first HARQ process. The retransmission starts at least at a second available retransmission occurrence according to the first HARQ operation mode, subsequent to the first TTI as illustrated in FIG. 4.

A number of so-called slave processes may be bundled with the so-called master process for the initial transmission attempt as illustrated in FIG. 5. In this case, an HARQ feedback is sent only for the master process. A potential retransmission of the master process can then be performed one RTT after the master process. If the level of process bundling is determined by the scheduler in the base station the level of process bundling must be signaled to the terminal. The information may either be provided dynamically via MAC control signaling or (semi-) statically via higher layer (RRC) control signaling.

The approach illustrated in FIG. 5 provides similar benefits as the above described first embodiment. Four TTIs are used for an initial transmission, where the first three TTIs are referred to as slave processes and the transmission in the last TTI is the actual initial transmission. The HARQ feedback is expected for the actual initial transmission and one required retransmission is transmitted by using the first available TTI. I.e. the TTI numbered 1 in FIG. 5 as the actual initial transmission used TTI 1. An advantage is the shorter round trip time, i.e., the time between the last process of the initial transmission attempt and the earliest possible retransmission. However, this approach may not allow bundling multiple processes for the retransmissions) as the HARQ feedback is not yet available upon the second occurrence of processes 6, 7 and 8. This mobile terminal could consequently not achieve the theoretically achievable throughput as some processes remain unused in case of retransmissions. Note that in the example provided in FIG. 5, two sets of processes can be scheduled (6, 7, 8, 1 and 2, 3, 4 5).

In accordance with a further alternative, the actual round trip time as well as the throughput are optimized by adapting the process numbering to the level of process bundling as illustrated in FIG. 6. The main advantage is that a terminal may use all TTIs for transmission which ensures high throughput. Also the RTT is minimized even though potentially slightly higher than with approach illustrated in FIG. 5.

However, the scheduler must handle the process identities separately per mobile terminal. Possible differences between the actual HARQ RTTs increase the risk for blocking, i.e., that a mobile terminal cannot be scheduled mobile terminal to a potentially upcoming retransmission of another mobile terminal.

The number of TTIs that are used in the first transmission round to transmit redundancy versions for a particular PDU is either signaled in a MAC control message denoted here as scheduling grant or is configured for that mobile terminal via RRC signaling. In the latter case the number of TTIs used for transmissions is typically valid for a longer period of time. However, it may be reconfigured, if needed to increase the radio resource efficiency. Obviously it is also possible to use a predetermined bundle size and to use MAC or RRC signaling for configuring the mobile terminal to use either the first or second HARQ operation mode.

Furthermore, the approach according to the embodiments of the invention is flexible. The mobile terminals could be configured to use an arbitrary number of TTIs for their transmissions and retransmissions, where the number of TTIs used for the transmission and the retransmissions may differ. Hence, in principle, the number of TTIs used for HARQ retransmissions could be chosen independently from the number of TTIs used for the first transmission. However, a simple approach would be to use the same amount of TTIs for the transmission as the retransmissions, which would simplify the resource allocation for the scheduler and would give 3 dB gain for one HARQ retransmission.

In addition, TTI bundling can be applied for both dynamic and semi-persistent scheduling. In both cases, the mobile terminal could be configured via RRC that TTI bundling should be used for all its transmissions. If such configuration takes place via RRC, the normal L1/L2 grant format can be re-used. There is no need for a dedicated grant format.

The mechanisms of the embodiments of the present invention may be used in combination with layer 2 (L2) segmentation. L2 segmentation implies, as stated above, that user data is segmented in smaller portions wherein each of the smaller portions then is transmitted in an independent HARQ processes.

Figure 8:
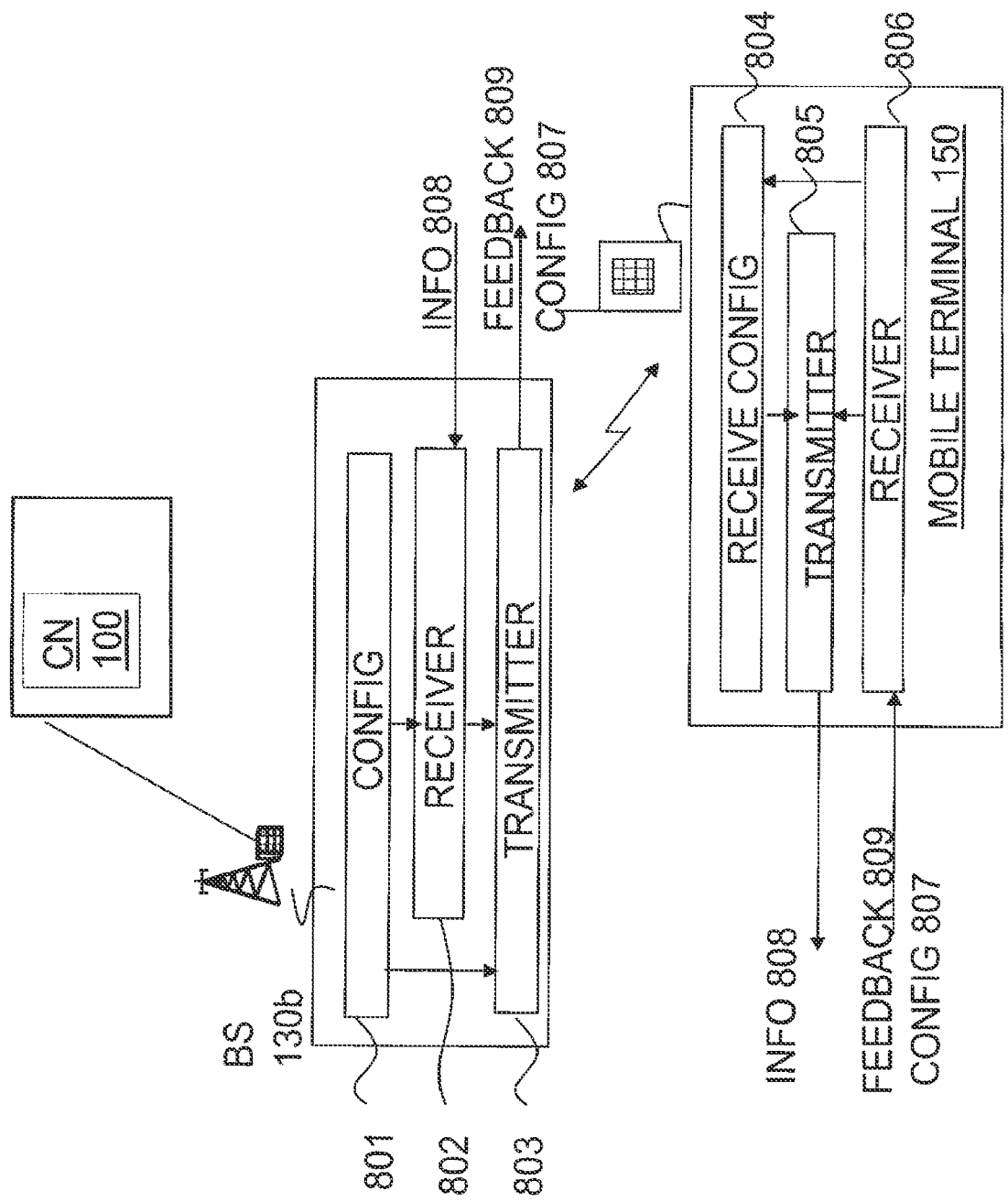
FIG. 8 illustrates a mobile terminal and base station according to one embodiment of the present invention.

Furthermore, the present invention also relates to a mobile terminal 150 wirelessly connectable to a radio base station 130*b* of a mobile telecommunication network. The mobile terminal 150 is illustrated in FIG. 8 and comprises means for transmitting 805 and receiving 806. The transmitter 805 is configured to transmit information 808 relating to a first HARQ process using a first predetermined number of TTIs comprising at least the first TTI and the second TTI. The receiver 806 is configured to receive feedback information 809 and may also be configured to receive 804 the configuration information 807 of the first predetermined number of TTIs either by RRC signaling or by MAC signaling and information via RRC signaling that a first predetermined number of TTIs comprising at least a first TTI and a second TTI should be used for all its transmissions.

In addition, the transmitter 805 is configured to retransmit information relating to the first HARQ process, using a second predetermined number of TTIs comprising at least one TTI, beginning at least at a second available retransmission occurrence according to the first HARQ operation mode, subsequent to the first TTI. Similar to the first predetermined number of TTIs, also the second predetermined number of TTIs may be received at the mobile terminal either by RRC signaling or by MAC signaling.

According to one embodiment, the first predetermined number of TTIs is equal to the second predetermined number of TTIs.

Moreover, the present invention concerns a radio base station 130*b* of a mobile telecommunication network wirelessly connectable to the mobile terminal 150 as illustrated in FIG. 8. The mobile telecommunication network supports at least two HARQ operation modes of which the first HARQ operation mode uses a single TTI for transmissions and retransmissions. The first HARQ operation mode is also referred to as the normal operation mode. The timing relationship in the first HARQ operation mode between transmissions and retransmissions is pre-determined and the time between HARQ transmission and retransmission is defined as HARQ round trip time. The radio base station comprises means for configuring 801 the mobile terminal 150 to transmit information 808, according to the second HARQ operation mode, relating to a first HARQ process using a first predetermined number of TTIs comprising at least a first TTI and a second TTI, to the radio base station, and to retransmit the information 808, according to the second HARQ operation mode, relating to the first HARQ process using a second predetermined number of TTIs. The retransmission begins at least at a second available retransmission occurrence according to the first HARQ operation mode, subsequent to the first TTI. The radio base station further comprises means for receiving 802 information relating to the first HARQ process using the first predetermined number of TTIs comprising at least the first TTI and the second TTI, and means for transmitting HARQ feedback 809 in response to the received information 808 on the first determined number of TTIs.

Figure 1:
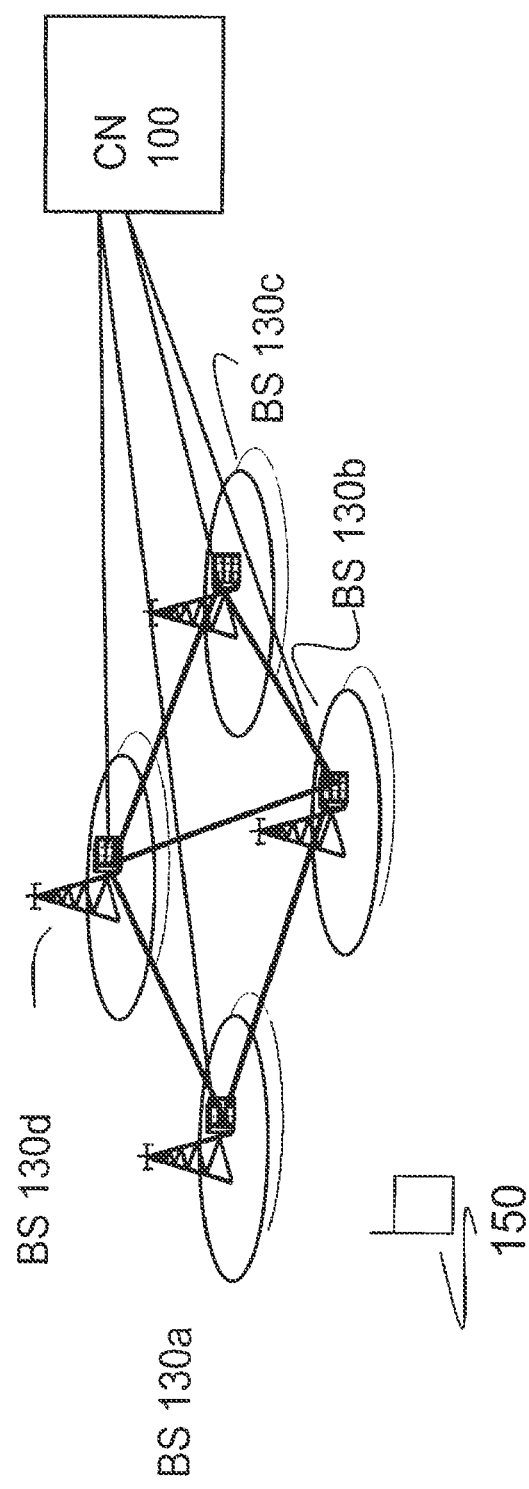
FIG. 1 is a schematically illustration of a mobile telecommunications network wherein the present invention may be implemented.
Figure 2:
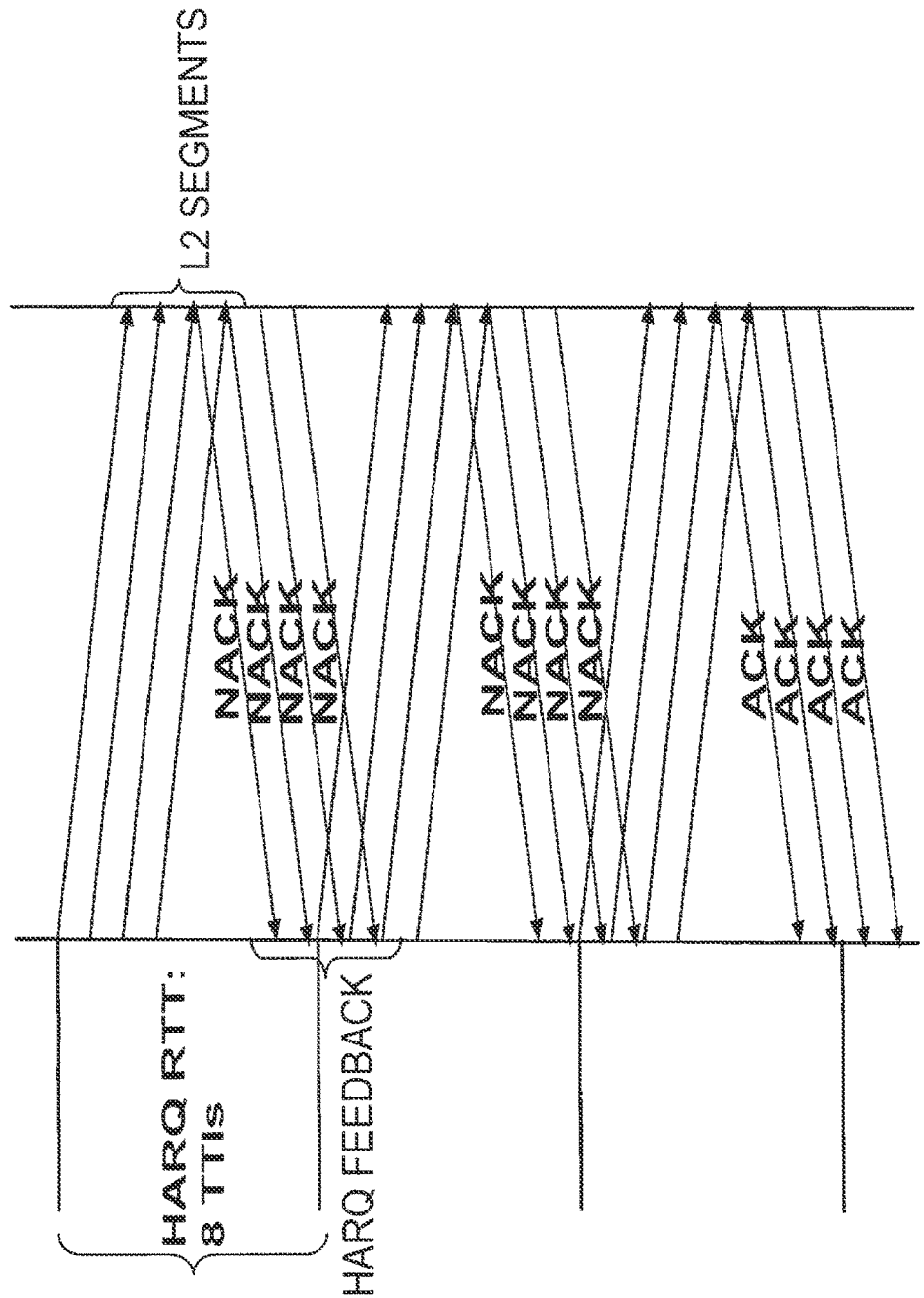
FIG. 2 is an illustration of a message sequence chart for layer 2 segmentation according to prior art.

The embodiments of the present invention may be used in an LTE network as illustrated in FIG. 1. Furthermore, the embodiments are applicable for both the Time Division Duplex mode and the Frequency Division Duplex mode of LTE. It should however be noted that the present invention is not limited to LTE but can be used in any communication network applying some kind of automatic repeat request functionality.

Accordingly, while the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A mobile terminal configured to support a first Hybrid Automatic Repeat Request (HARQ) operation mode and a second HARQ operation mode, the first HARQ operation mode using a single Transmission Time Interval (TTI) for transmissions and retransmissions, and where a timing relationship between transmissions and retransmissions is defined by a first HARQ round trip time, the mobile terminal comprising:
   a transmitter configured to transmit to a base station, when the mobile terminal is operating in the second HARQ operation mode, an information packet relating to a first HARQ process as a first TTI bundle including a first predetermined number of multiple, consecutive TTIs, wherein a different redundancy version of the information packet related to the first HARQ process is transmitted in each TTI within the first TTI bundle; and
   a receiver to receive an indication that the information packet related to the first HARQ process was not decoded correctly at the base station,
   wherein when the mobile terminal is operating in the second HARQ operation mode, the transmitter is configured to retransmit the information packet related to the first HARQ process as a second TTI bundle using a second predetermined number of multiple, consecutive TTIs starting after the first HARQ round trip time and an additional delay from one of the TTIs in the first TTI bundle.

2. The mobile terminal of claim 1, wherein retransmission begins at the first HARQ round trip time and an additional delay from one of the TTIs in the first TTI bundle.

3. The mobile terminal of claim 1, wherein the mobile terminal is configured to receive information indicating the first predetermined number of multiple, consecutive TTIs or the second predetermined number of multiple, consecutive TTIs to be used for transmission of the information packet relating to the first HARQ process.

4. The mobile terminal of claim 1, wherein the first predetermined number of multiple, consecutive TTIs is equal to the second predetermined number of multiple, consecutive TTIs.

5. The mobile terminal of claim 1, wherein a plurality of redundancy versions of a same information packet related to the first HARQ process is transmitted within the first TTI bundle.

6. The mobile terminal of claim 1, wherein the mobile terminal is configured to receive information via Radio Resource Control (RRC) signaling that a first predetermined number of multiple, consecutive TTIs comprising at least a first TTI and a second TTI should be used for transmissions.

7. The mobile terminal of claim 1, wherein the receiver is configured to receive an HARQ negative acknowledgment (NACK) from the base station when an initial number of transmissions of the information packet related to the first HARQ process is not sufficient for successful reception by the base station.

8. The mobile terminal of claim 1, wherein the transmitter is configured to retransmit the information packet related to the first HARQ process as a second TTI bundle starting at a bundle HARQ round trip time subsequent to the first TTI bundle.

9. The mobile terminal of claim 8, wherein the transmitter is configured to retransmit the information packet related to the first HARQ process as a second TTI bundle in response to detecting a timeout.

10. The mobile terminal of claim 1, wherein the first predetermined number of TTI is equal to four.

11. A method for a mobile terminal configured to support a first Hybrid Automatic Repeat Request (HARQ) operation mode and a second HARQ operation mode, the first HARQ operation mode using a single Transmission Time Interval (TTI) for transmissions and retransmissions, and where a timing relationship between transmissions and retransmissions is defined by a first HARQ round trip time, the mobile terminal comprising:

transmitting to a base station, when the mobile terminal is operating in the second HARQ operation mode, an information packet relating to a first HARQ process as a first TTI bundle including a first predetermined number of multiple, consecutive TTIs, wherein a different redundancy version of the information packet related to the first HARQ process is transmitted in each TTI within the first TTI bundle; and receiving an indication that the information packet related to the first HARQ process was not decoded correctly at the base station, when the mobile terminal is operating in the second HARQ operation mode, retransmitting the information packet related to the first HARQ process relating to the first HARQ process as a second TTI bundle using a second predetermined number of multiple, consecutive TTIs starting after the first HARQ round trip time and an additional delay from one of the TTIs in the first TTI bundle.

12. The method of claim 11, wherein retransmission begins at the first HARQ round trip time and an additional delay from one of the TTIs in the first TTI bundle.

13. The method of claim 11, further comprising receiving information indicating the first predetermined number of multiple, consecutive TTIs or the second predetermined number of multiple, consecutive TTIs to be used for transmission of the information packet relating to the first HARQ process.

14. The method of claim 11, wherein the first predetermined number of multiple, consecutive TTIs is equal to the second predetermined number of multiple, consecutive TTIs.

15. The method of claim 11, wherein a plurality of redundancy versions of the same information packet related to the first HARQ process is transmitted within the first TTI bundle.

16. The method of claim 11, further comprising receiving information via Radio Resource Control (RRC) signaling that a first predetermined number of multiple, consecutive TTIs comprising at least a first TTI and a second TTI should be used for transmissions.

17. The method of claim 11, further comprising receiving an HARQ negative acknowledgment (NACK) from the base station when an initial number of transmissions of the information packet related to the first HARQ process is not sufficient for successful reception by the base station.

18. The method of claim 11, further comprising retransmitting the HARQ process information relating to the information packet related to the first HARQ process as a second TTI bundle starting at a bundle HARQ round trip time subsequent to the first TTI bundle.

19. The method of claim 18, further comprising transmitting the HARQ process information relating to the first information packet related to the first HARQ process as a second TTI bundle in response to detecting a timeout.

20. The method of claim 11, wherein the first predetermined number of TTI is equal to four.

* * * * *